(No Model.) 2 Sheets—Sheet 2.
G. W. RANDOLPH.
CULTIVATOR.
No. 376,008. Patented Jan. 3, 1888.
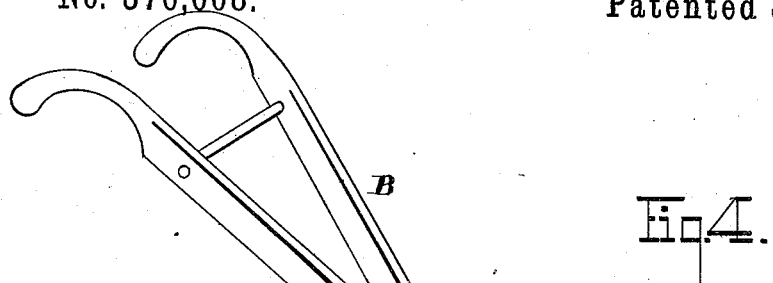
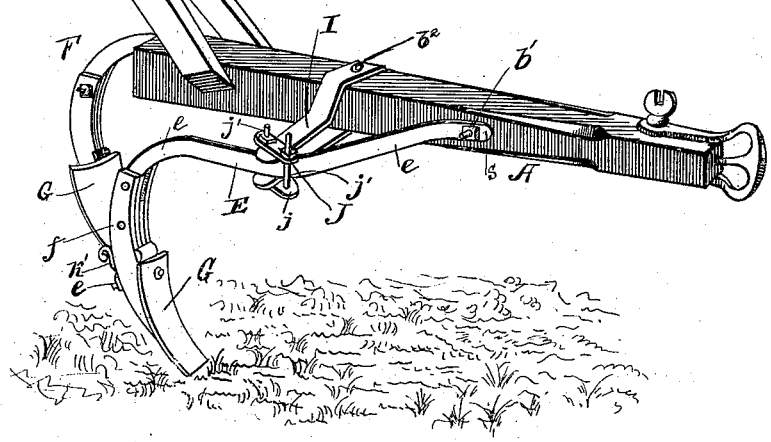
WITNESSES
E. H. Perry,
W. F. Bernhard
INVENTOR
George W. Randolph
By Edson Bros
Attorneys.

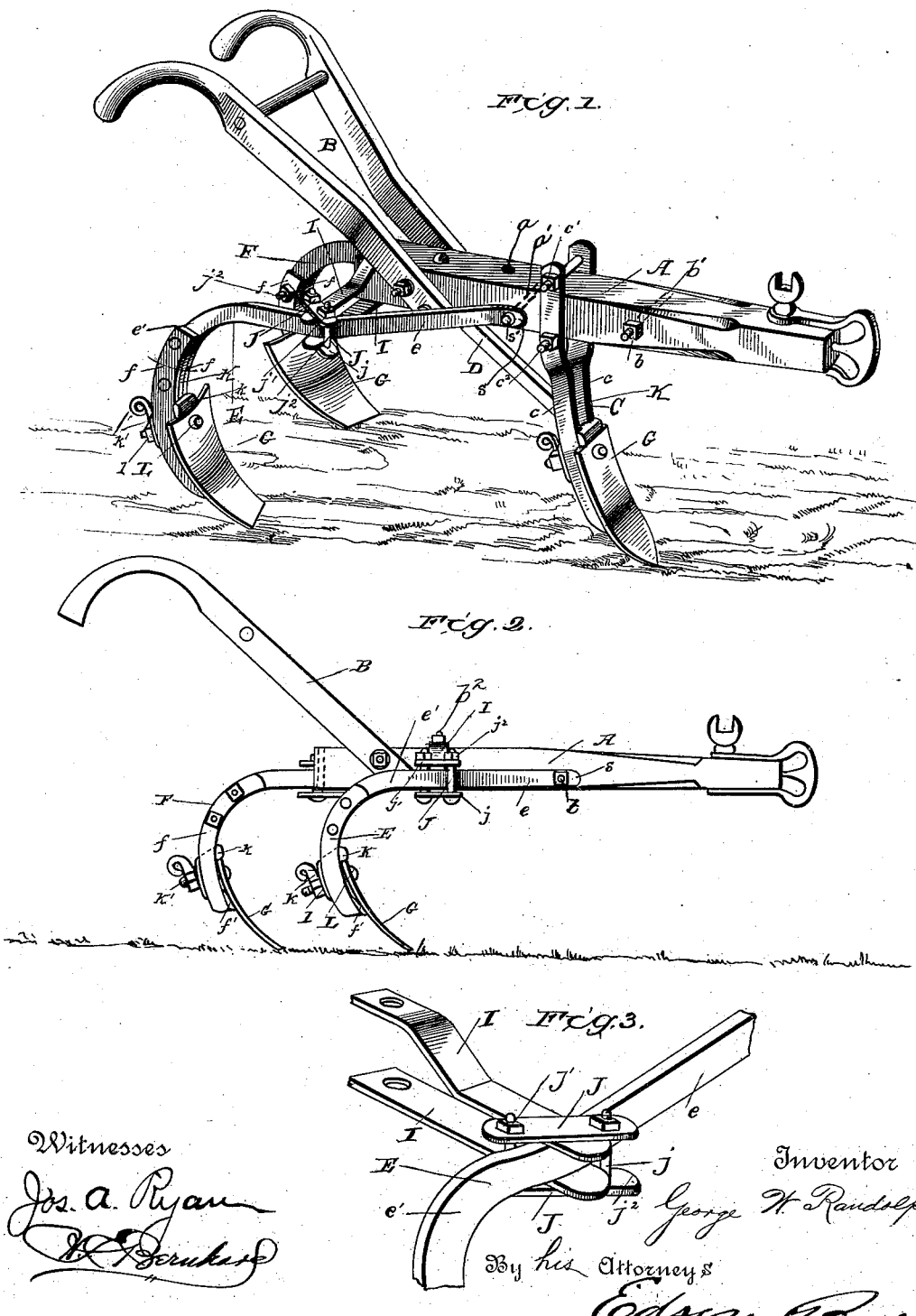

UNITED STATES PATENT OFFICE.

GEORGE W. RANDOLPH, OF MEMPHIS, TENNESSEE.

CULTIVATOR.

SPECIFICATION forming part of Letters Patent No. 376,008, dated January 3, 1888.

Application filed September 5, 1887. Serial No. 248,831. (No model.)

*To all whom it may concern:*

Be it known that I, GEORGE W. RANDOLPH, a citizen of the United States, residing at Memphis, in the county of Shelby and State of Tennessee, have invented a certain new and useful Improvements in Listing-Plows, Double Shovels, and Cultivators; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to an improvement in cultivators; and it consists of the peculiar combination and construction of devices, as will be hereinafter fully described, and particularly pointed out in the claims.

The object of my present invention is to provide an improved implement which can be quickly and easily adjusted to vary the distance between the plows to suit the width of the rows, and a further object is to make the plows adjustable longitudinally of the beam of the implement, so that one will be in advance of the other.

The implement can be used for listing purposes, in which event a front shovel is arranged in advance of the rear shovels, the latter being right and left handed to properly throw the earth against the sides of the hills, and the front plow or shovel can be removed to adapt the implement to straddle the row, the rear shovels being properly adjusted relatively to each other for this purpose.

In the accompanying drawings, Figure 1 is a perspective view of my improved implement, showing it adjusted for use for listing purposes. Fig. 2 is a like view showing the front shovel removed and the rear plows adjusted, one in advance of the other, for straddling the row. Fig. 3 is a detail view of one of the rear plows and the adjustable device for supporting and bracing the same. Fig. 4 is a perspective view of the implement with the front shovel and its standard detached and one of the rear plow-stocks adjusted in advance of the other corresponding stock, and Fig. 5 is a vertical sectional view through the lower end of the rear plow-stocks to show the devices for adjusting the shovel vertically thereon.

Referring to the drawings, in which like letters of reference denote corresponding parts in all the figures, A designates the draft-beam of the implement, and B the handles, which are secured to the beam and braced in the usual well-known manner. The beam A is provided at or near the point where the handles are connected thereto with a vertical opening, $a$, for the passage therethrough of a bolt, and two horizontal openings, $a'$ and $b'$, are formed transversely in the beam at suitable distances from each other and in advance of the vertical bolt-hole $a^2$, as indicated in dotted lines in Fig. 1, the function of which will be hereinafter explained.

C is the front plow-stock, which is made of two pieces or plates of metal, $c$, which are properly spaced apart to clasp the beam A at their upper ends, and these plates $c$ are firmly and detachably secured to the beam by a pair of bolts, $c'$ $c^2$, which are passed through the plates on opposite sides of the beam above and below the same. This stock is braced by an inclined arm, D, which is firmly bolted at its upper end to the beam, and the lower end is secured between the plates $c$ of the stock on a suitable pin or bolt, which is supported in the plates.

E F are the rear plow-stocks, which are each formed of a single piece of bar metal. This bar is bent to form the horizontal and downwardly-curved portions $e$ $e'$, respectively, and the horizontal portion of the bar is bent laterally at an intermediate point of its length, so that the front end thereof lies in an inclined position to the rear end of the said horizontal portion. To the lower end of the curved rear portion of the stock are secured parallel plates $f$, which extend below the lower extremity of the stock, and the extreme lower ends of these parallel plates are connected and strengthened by a block, $f'$, which is interposed between and suitably secured to the plates, a space or slot being formed between the plates of the stock through which adjustable slides are passed or fitted for the support of the shovels G.

The stocks E F are arranged on opposite sides of the beam A of the implement, and the horizontal portions of the stocks diverge laterally from the beam. The front end of each stock may be provided with inclined lips, through which is formed a transverse perforation that is adapted to align with the bolt-hole $a'$, and thereby permit a bolt, $s'$, to be passed through the lip and beam to connect the parts together, both plow-stocks being connected to the beam by the single through bolt $s'$. When it is desired to adjust the plow-stocks laterally, the nut $s^2$ on the bolt $s'$ is loosened or unscrewed from the bolt the required distance to permit one or both of the plow-stocks to be adjusted to the desired position, and the nut is again screwed home. The rear end of each stock E F is braced and held in its adjusted position by a pair of arms, I, which are connected to the beam at the rear end of the latter, and the stock at an intermediate point of its length. When the implement is adjusted for listing purposes, the inner ends of the pair of arms for each stock E F is secured to the rear end of the beam A by a single through-bolt, and the outer ends of the said arms cross the horizontal portions of the stocks at the point where the same are bent laterally, as shown, the said outer ends of the braces or arms being connected to the stocks by clips or irons J. These clips or irons are each formed of a pair of flat plates, $j\ j'$, which are arranged one above the other, and two through-bolts, $j^2$, which are passed through the flat horizontal plates of the clips on opposite sides of the horizontal portion of the stock and the braces or arms I.

When the clip is connected to the stock and braces, the outer ends of the latter are properly arranged across the stock, the horizontal plates $j\ j'$ of the clip are placed in inclined parallel positions across both the braces and the stock, and one bolt, $j^2$, is passed through one end of the clip-plates on one side of the plow-stock and the braces, while the other bolt, $j^2$, is passed through the opposite ends of the clip-plates and on the reverse side of the stock and braces. By this peculiar form of clip the braces are securely and firmly connected to the stock to brace and strengthen the latter, and the clip can be readily released to permit the stock to be adjusted laterally of the beam A and the other stock.

Each of the shovels is adjustably connected to its stock, so that it can be raised or lowered at will; and to accomplish this purpose I provide each shovel with an adjustable slide, K, which is fitted in the slot formed in the lower end of the stock. Each slide is formed at its front end with an enlarged head, $k$, which bears against the front edges of the stock, and a plate, $k'$, is formed at the rear end of the slide, which bears against the rear side of the stock. Through the plate is formed a transverse bolt-hole, and through this aperture passes a bolt, L, which is connected to the shovel at its headed end, and has a nut, $l$, at its rear end, which bears against the plate of the slide to tighten the slide against the stock, and thus secure the slide and shovel in place on the stock.

The operation of my invention is obvious. When it is desired to adjust the rear plows nearer together or farther apart, the clips of one or both plows are loosened, the nut $s^2$ on the bolt $s'$ is also loosened, the stock moved in the required direction to the proper position desired, and the nut $s^2$ and the clip again tightened to hold both the front and rear ends of the stock firmly in place.

When it is desired to adjust one of the rear plows in advance of the other corresponding plow, the front stock, C, and the brace D thereto are first detached by removing the bolts which secure said parts in place. One of the rear plows and the brace I thereto is then detached from the beam by removing the bolt $s'$ and the bolt that secures the inner end of the brace to the beam, said bolts being replaced to secure the other plow stock and brace to the implement in its usual position. The plow stock and brace that have previously been detached are moved alongside of the beam in advance of the other plow-stock, and the stock is moved until the bolt-hole in the lip $s'$ thereof aligns with the bolt-hole $b'$, and a bolt, $b$, is passed through said aligned holes to firmly connect the front end of the plow-stock to the beam. The inner end of the brace I, attached to the plow-stock just described, is moved so that the opening in the inner end thereof aligns with the bolt-hole $a'$, and a suitable bolt, $b^2$, is passed through the brace and beam to secure the parts firmly together.

It will be understood that either of the plows on the right or left hand side of the beam can be adjusted in advance of the other plow.

If desired, the rear plows can be detached entirely from the draft-beam and the front stock adjusted a short distance toward the rear end of the beam to adapt the implement for use in the manner of single-stock cultivators.

I do not desire to confine myself to the exact manner of connecting the front ends of the plow-stocks to the draft-beam by a single through-bolt, or to the details of construction and form and proportion of parts herein shown and described, as I am aware that changes therein can be made without departing from the spirit or sacrificing the advantages of my invention.

Having thus fully described my invention, what I claim as new, and desire to secure by Letters Patent, is—

1. In a cultivator, the combination of a beam, a plow-stock connected at its front end thereto, a brace connected at its inner end directly to the beam, and a clip, J, comprising horizontal plates arranged diagonally across the brace where the latter crosses the plow-stock, and bolts passing through the plates on opposite sides of the stock and brace, substantially as and for the purpose set forth.

2. In a cultivator, the combination of a beam, the rear plow-stocks arranged on opposite sides of the beam and detachably connected at their front ends to the beam, and braces, each formed of a single piece of metal and adjustably fixed at its outer end to one of the stocks and detachably connected at its inner end to the beam, each plow-stock and its brace being adapted to be detached from the beam and adjusted in a horizontal line toward the front end and lengthwise of the beam and to be connected thereto by suitable bolts, as and for the purpose described.

3. In a cultivator, the combination of a beam having the vertical and horizontal bolt-holes $a\ a'$, located as described, and the rear plows having the stocks thereof connected to the beam and braces detachably connected at their inner ends to the beam and secured at their outer ends to the plow stocks, one of the plow-stocks and the brace thereof being adapted to be adjusted longitudinally of the beam, so that the same can be connected to the beam by bolts which are passed through the vertical and horizontal holes $a\ a'$, substantially as and for the purpose set forth.

4. In a cultivator, the combination of a beam, the rear plows, each having a stock connected at its front end to the beam, and a flat-bar brace for each plow connected at its outer end to the stock by an adjustable clip and at an intermediate point of the stock and detachably connected at its inner end to the beam, either of the plow-stocks and the brace therefor being adjustable longitudinally of the beam and in advance of the other stock or brace, substantially as described.

In testimony whereof I affix my signature in presence of two witnesses.

GEORGE W. RANDOLPH.

Witnesses:
R. P. ECKFORD,
J. P. WILLS.